Figure 21:
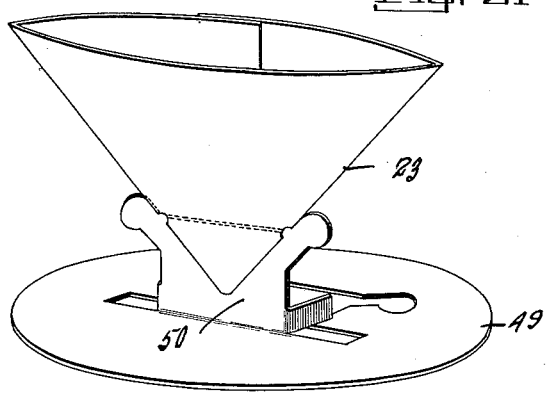

May 17, 1932.   C. S. CONLON   1,858,435
COMBINATION CITROUS FRUIT SQUEEZER AND FOOD HOLDER
Filed Jan. 9, 1931   4 Sheets-Sheet 1
Fig. 1
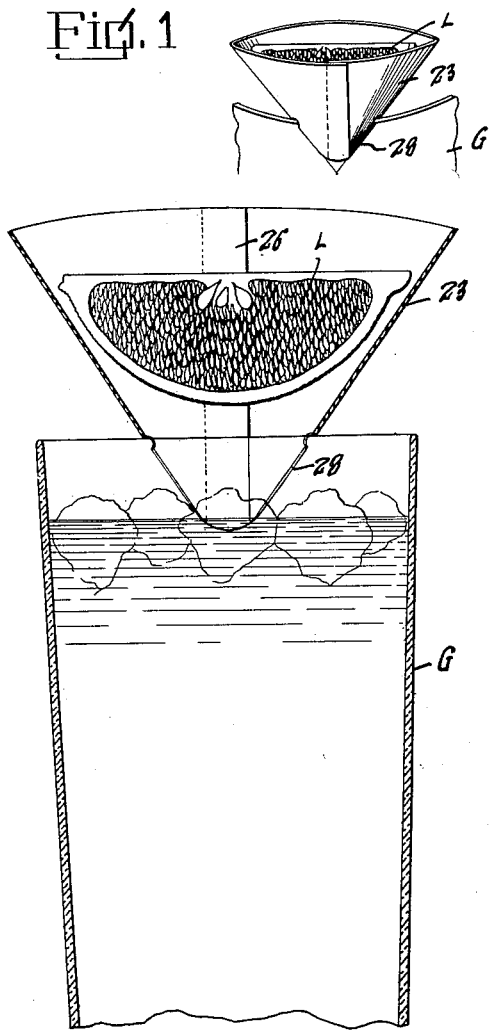
Fig. 2
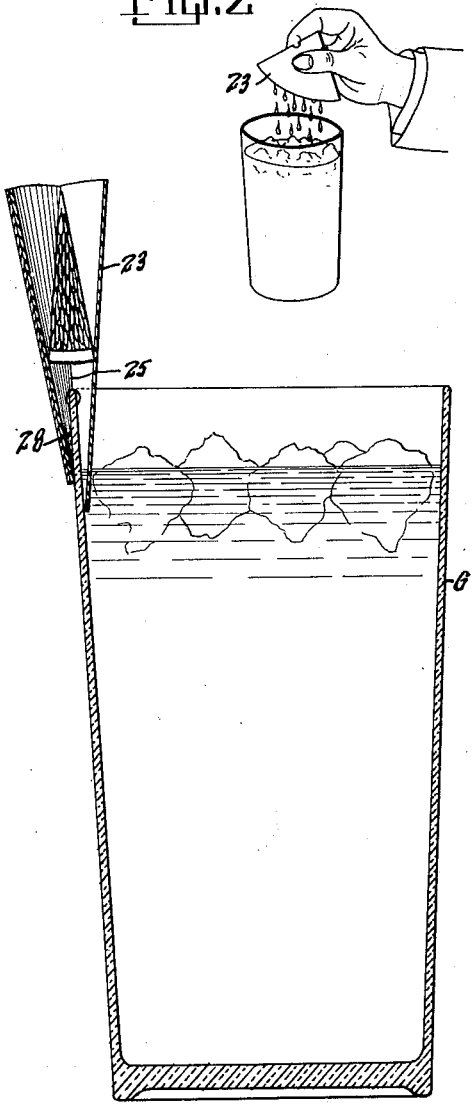
Fig. 3
Fig. 4
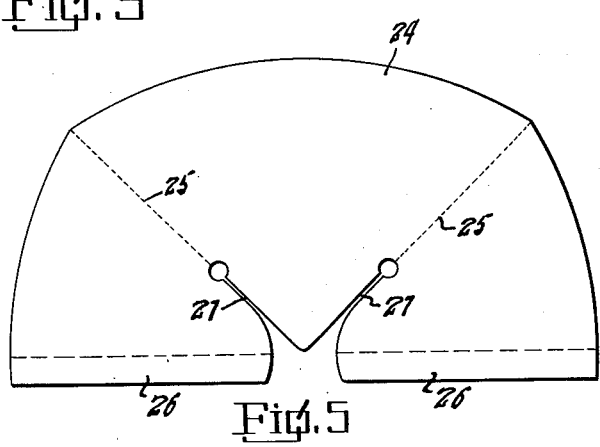
Fig. 5
Charles S. Conlon
INVENTOR
BY R. J. Whitaker
ATTORNEY May 17, 1932.   C. S. CONLON   1,858,435
COMBINATION CITROUS FRUIT SQUEEZER AND FOOD HOLDER
Filed Jan. 9, 1931   4 Sheets-Sheet 2
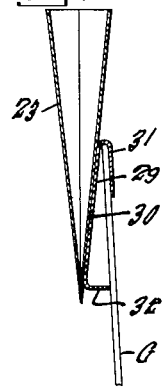
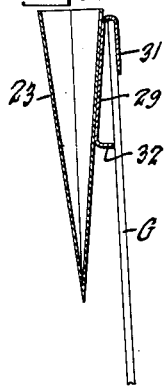
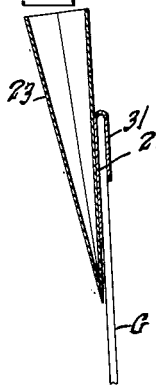
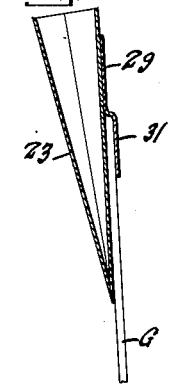
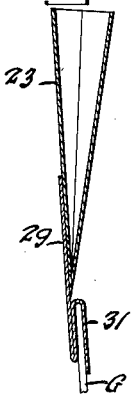
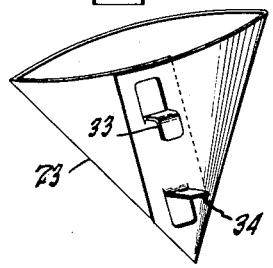
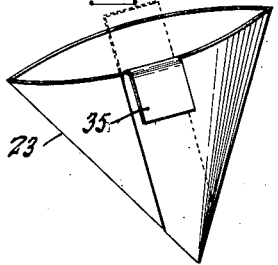
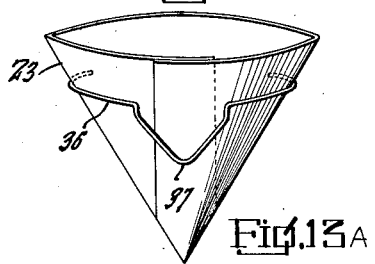
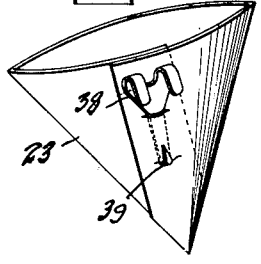
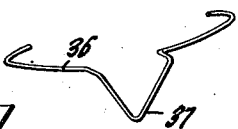
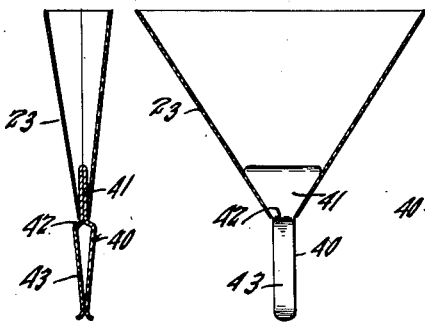
Charles S. Conlon
INVENTOR
BY R. J. Whitaker
ATTORNEY May 17, 1932.  C. S. CONLON  1,858,435
COMBINATION CITROUS FRUIT SQUEEZER AND FOOD HOLDER
Filed Jan. 9, 1931  4 Sheets-Sheet 3
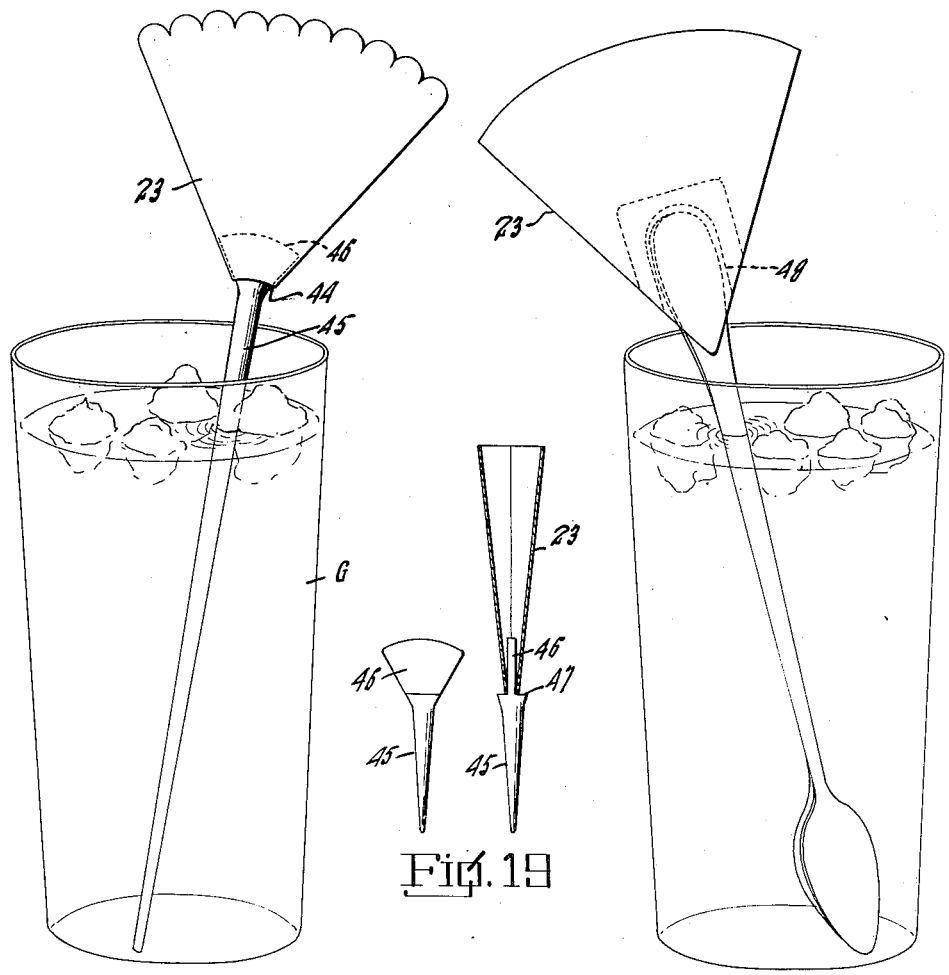
Charles S. Conlon
INVENTOR
BY R. J. Whitaker
ATTORNEY May 17, 1932.     C. S. CONLON     1,858,435
COMBINATION CITROUS FRUIT SQUEEZER AND FOOD HOLDER
Filed Jan. 9, 1931     4 Sheets-Sheet 4

Charles S. Conlon
INVENTOR
BY
ATTORNEY

Patented May 17, 1932

1,858,435

UNITED STATES PATENT OFFICE

CHARLES S. CONLON, OF TULSA, OKLAHOMA

COMBINATION CITROUS FRUIT SQUEEZER AND FOOD HOLDER

Application filed January 9, 1931. Serial No. 507,699.

This invention relates to a citrous fruit squeezer, the same device sometimes being used as a container or holder for foods or condiments, etc.

The object of the invention is to provide a sanitary device, and one which may be readily attached to a drinking receptacle or food holder. A still further object is to provide a fruit squeezer and sanitary food holder which is inexpensive, easy to manufacture, and quickly arranged for use. Numerous other objects and advantages will appear from the following description taken in connection with the subjoined claims. The invention in its several forms is illustrated in the drawings accompanying the application.

Referring to the drawings, Figure 1 is a perspective view of the device. Fig. 2 is a perspective view showing manual application of the same. Fig. 3 is a vertical cross-section of the article of manufacture, attached to a glass. Fig. 4 is a vertical sectional view taken at right angles to that shown in Fig. 3. Fig. 5 is a plan view of a blank.

Figs. 6, 7, 8, 9 and 10 are vertical cross-sectional views of modified forms. Figs. 11, 12 and 13 are perspective views of the container connected with different forms of clips. Fig. 13A is a detailed perspective view of the supporting means shown in Fig. 13. Fig. 14 is a perspective view showing the device with a different form of attachment. Figs. 15, 16 and 17 show modification of the attaching medium.

Fig. 18 is a perspective view of another form of container. Fig. 19 is a still further application of the device, attached to a skewer. Fig. 20 shows the container attached to a spoon.

Figure 22:
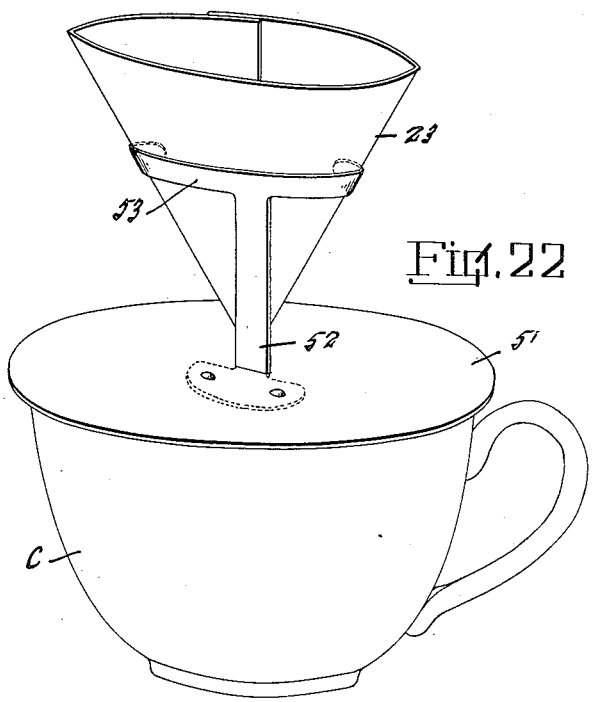

Fig. 21 is a perspective view of another application, and Fig. 22 is a perspective view of another modified form.

Referring to the drawings, wherein the same part is indicated by the same reference numeral, 23 is a container cut from blank 24 of the peculiar shape shown in Fig. 5. As this is semi-circular, it is of its minimum area, that is to say, two of the blanks may be cut from one circular blank. It is folded on lines 25 and provided with flaps 26 which are pasted each to the other. The stamping of the blank provides cuts 27 which, when the device is folded, form a slot 28 which attaches the glass G.

In the device or container may be placed a piece of citrous fruit, such as a cut of lemon. The several other forms of the container shown throughout the different views are adapted to contain other articles for table use.

Referring to Figs. 6 et seq., a cardboard strip 29, attached to container 23 at 30, is bent at its upper end to form a hook 31, and the lower end is bent to form a spacing ear 32, adapted to keep the container in a vertical position.

Fig. 11 shows a metal hook 33. This form is also shown with a spacing ear 34, or as illustrated in Fig. 12, a projection may be bent to form a hook 35. The form shown in Fig. 13 is a wire hook or bail 36, following generally the contour of the holder, and having a downwardly bent portion 37 for attachment to tumbler G.

Fig. 14 illustrates a stamped metal hook 38 forced into the container and positioned by clamp 39. Figs. 15, 16 and 17 show a clip 41, formed of a piece of metal bent upon itself, having triangular portions with apices 42, bent downwardly to form shoulders, and the apices are extended to form a clip 43.

Figs. 18 and 19 show the device perforated in the bottom 44 to attach to a skewer or glass stick 45, and the skewer shown in Fig. 19 has a head 46 with shoulders 47. Fig. 20 shows the container 23 having a socket 48, for an obvious purpose. In Fig. 21, the holder 23 has a base 49 with upstanding ears 50 to support the member 23. In Fig. 22 there is illustrated a base 51 having a standard 52 and T-arms 53. In this form a cup of coffee is kept hot until used, and the container 23 is adapted to hold sugar or cream, etc. The preceding form, Fig. 21, is for substantially the same purpose.

Not only do the several forms show a citrous fruit squeezer wherein the fruit and juice need not be touched by the fingers, but it is clear that many articles of food may be carried in the containers attached to the food dishes. I now give a few of the many uses to which my construction may be put, but it is clear that there are many other purposes not now contemplated, which must be deemed within the scope of my invention.

Crackers could be held in the container, to be positioned on a soup bowl. Many restaurants, particularly the cheaper class establishments, dislike to put a full bottle of catsup on the table, and a small portion may be put into my container. One of the forms might hold a tea bag. After-dinner mints could also be held.

It is obvious that if the container is made of paper, advertisements could be printed upon it. However, I do not wish to limit myself to the device being made of paper. It could be made of celluloid or other material. In all the forms described, my object has been to provide a simple and inexpensive attachment which is sanitary, wherein the fingers do not have to touch the material to be held or carried.

While I have shown and described the preferred forms of my invention, it will be obvious that various changes in the details of construction and in the proportions may be resorted to for successfully carrying my invention into practice, without sacrificing any of the novel features or departing from the scope of the appended claims.

What I claim and desire to secure by Letters Patent of the United States is:

1. A lemon squeezer comprising a collapsible tapered receptacle for the reception of a piece of lemon, the smaller end of said receptacle being provided with means for receiving a support.

2. A fruit squeezer comprising a collapsible tapered receptacle for the reception of a piece of fruit, opposite walls of said receptacle limiting the movement of the fruit towards the smaller end of the receptacle, said smaller end of the receptacle being recessed for the reception of a support.

3. A fruit squeezer comprising a collapsible conically shaped receptacle for the reception of a piece of fruit, the smaller end of said conically shaped receptacle being slotted for the reception of a support.

4. A fruit squeezer comprising a collapsible receptacle for the reception of a piece of fruit, said receptacle having its upper end open, the bottom of said receptacle being recessed for the reception of a support for supporting the receptacle with its open end upwardly disposed.

CHARLES S. CONLON.